Patented May 29, 1951

2,554,819

UNITED STATES PATENT OFFICE 2,554,819

SELECTIVE ABSORBENT AND METHOD OF MANUFACTURING AND USING THE SAME

David K. Eads, Pittsburgh, Pa., assignor to Texas Gulf Sulphur Company, New York, N. Y., a corporation of Texas No Drawing. Application October 26, 1948, Serial No. 56,670

2 Claims. (Cl. 23—2)

This invention relates to a selective absorbent and its use in separating hydrogen sulfide from gaseous mixtures which also contain sulfur dioxide. Such selective absorption is desirable, both as an analytical procedure and as a means of purifying sulfur dioxide-containing gases by removing hydrogen sulfide therefrom, but no satisfactory means for effecting it substantially quantitatively have hitherto been known.

As is well known, hydrogen sulfide reacts with a large number of materials to form solid sulfides, and the substantially quantitative separation of hydrogen sulfide from gas streams which are relatively free of other sulfur compounds is not difficult. However, the presence of sulfur dioxide as another component of the gas stream to be treated introduces complications which, prior to my present invention, have not been satisfactorily solved. For example, hydrogen sulfide and sulfur dioxide react together under appropriate conditions to form sulfur and water. This reaction occurs readily on a moist surface if the moistening liquid is neutral or acidic. The sulfur formed clogs the absorbent, thus decreasing its capacity for removal of hydrogen sulfide and decreasing the yield of sulfur dioxide and the accuracy of the analytical procedure. On the other hand, if the moistening liquid is basic, hyposulfates may be formed which in turn produce analytical errors and decreased yields.

Some absorbents which have been suggested, such as anhydrous copper sulfate, have been found unsuitable for analytical work because the reaction of the absorbent with the hydrogen sulfide forms acids which in turn react with a portion of the hydrogen sulfide to form sulfur dioxide.

The ideal absorbent for the separation should be a solid capable of being crushed or ground into particles of a size which will permit their being charged into an absorption train or absorption tower without building up too much back pressure and of sufficient mechanical strength to withstand normal handling. It should be effective through relatively wide ranges of hydrogen sulfide and sulfur dioxide concentration to remove the hydrogen sulfide substantially quantitatively and to allow the sulfur dioxide to pass through unchanged. It has been suggested that hydrogen sulfide can be absorbed by means of a precipitated copper phosphate produced by mixing aqueous solutions of hydrogen disodium phosphate and cupric sulfate and drying the resulting precipitate at about 212° F. However, I have found that the product prepared as described was inconsistent from the standpoint of yield, ability to react with hydrogen sulfide, and physical properties, and consequently did not provide a satisfactory selective absorbent. I have found that an absorbent which is uniform, consistent in its operation, and free of the disadvantages mentioned, can be prepared by reacting together solutions of copper salts and phosphates as hereinafter described while maintaining a carefully controlled hydrogen ion concentration.

I have found that the precipitate formed on mixing solutions of copper salts and of potassium or sodium phosphates depends not merely on the reactants and their concentration but also on the hydrogen ion concentration of the reaction mixture. Thus, regardless of whether the phosphate solution contains the primary, secondary or tertiary orthophosphate anions, or mixtures thereof, the composition of the precipitated copper phosphate will depend on the hydrogen ion concentration of the solution when the reactants are mixed. The nature of the copper phosphate precipitate determines not only the effectiveness of the finished material for the selective absorption of the hydrogen sulfide but also determines the ease or difficulty of the succeeding steps in preparing and purifying the absorbent. In some cases there is obtained a slimy gelatinous precipitate which contains, in addition to the phosphate, varying amounts of copper hydroxide. Such a precipitate can be filtered only with great difficulty and the product has neither the mechanical properties nor the absorption characteristics required.

I have found that an absorbent having the required physical and chemical properties can be prepared by proper control of the reaction conditions.

In preparing the selective absorbent of my invention I prefer to first make separate solutions of a cupric salt and of sodium or potassium orthophosphates. For the copper solution I prefer to use cupric sulfate, although other soluble cupric salts may be used. The phosphate solution may contain all of the anions tertiary, secondary, or primary orthophosphates, although I prefer to use the monobasic orthophosphate of potassium or sodium. In preparing the solutions I adjust the relative amounts of cupric salt and phosphates in the theoretical stoichiometric proportion to form tribasic cupric orthophosphate according to the reaction:

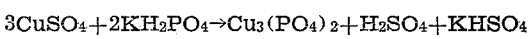
$$3CuSO_4 + 2KH_2PO_4 \rightarrow Cu_3(PO_4)_2 + H_2SO_4 + KHSO_4$$

The solutions are then mixed together, with good stirring, at a temperature from approximately 15 to 90° C. I have found that any temperature in this approximate range will give good results, although I have obtained precipitates most easy to filter by using temperatures in the upper part of the range. After the solutions are mixed, and while the resultant slurry is being stirred, I add sufficient sodium or potassium hydroxide to adjust the pH of the mixture in the range 1 to 5, and preferably from 3.0 to 3.2, inclusive. I then filter the precipitate and wash it several times by dispersing it in water and refiltering it. The first washes may be with ordinary tap water but I prefer to perform the last wash and preferably the last two washes with distilled water. The washed precipitate is dried for several hours at temperatures from 220° F. to 1200° F. until no further loss of water occurs. The temperature range of 500° to 700° F. is preferred.

I have analyzed the product made at the preferred hydrogen ion concentration and drying temperature, and found its ultimate analysis to give the following weight percentages:

| | |
|---|---|
| Copper | 41.7 |
| Phosphorous | 16.6 |
| Water | 5.9 |
| Oxygen | 35.8 |

The mixed phosphate obtained by my procedure is very active and of extreme selectivity which is not true of materials prepared in other ways. If the hydrogen ion concentration is increased above a pH value of about 5, the activity of the product is unsatisfactory, and it gradually decreases further with increasing pH. The product of reaction at a pH of about 8 is totally inactive. When operating at a pH below 1 the product is too soluble to obtain an economic yield. Best results are obtained in the pH range 3.0 to 3.2, from the standpoint of yield and selectivity.

The dried product obtained as above may be ground and used in powdered or granular form or maybe pelleted in pilling machines or mixed with a suitable binder and extruded into desired shapes.

The effectiveness and selectivity of my absorbent can be seen from the following test runs in which a gaseous mixture containing hydrogen sulfide and sulfur dioxide was passed through an absorption train containing, in the order given, calcium chloride as a drying agent, my product which is produced as described, and Ascarite, which is an absorbent comprising sodium hydroxide and asbestos and is adapted to absorb acidic vapors and gases. The train was so arranged that any moisture driven from the phosphates by the heat of reaction did not escape the hydrogen sulfide absorption device and become absorbed in the Ascarite. This result was achieved by packing the exit side of the hydrogen sulfide absorber with an additional amount of the drying agent.

| Run Number | 1 | 2 | 3 | 4 |
|---|---|---|---|---|
| Total Flow Rate, c. f. m | 0.00956 | 0.01128 | 0.01530 | 0.01568 |
| Time, min | 3.00 | 2.00 | 3.00 | 2.500 |
| Mole per cent, $H_2S$ | 15.71 | 14.88 | 9.48 | 9.60 |
| Mole per cent, $SO_2$ | 9.62 | 6.82 | 4.97 | 6.44 |
| Mole per cent, $N_2$ | 74.67 | 78.30 | 85.55 | 84.00 |
| Weight of $H_2S$ (g.) | 0.194 | 0.144 | 0.187 | 0.161 |
| Weight gain in copper phosphate (g.) | 0.201 | 0.144 | 0.184 | 0.157 |
| Difference (g.) | .007 | 0.000 | −.003 | −0.004 |
| Weight of $SO_2$ (g.) | 0.223 | 0.125 | 0.185 | 0.204 |
| Weight gain in Ascarite (g.) | 0.216 | 0.123 | 0.193 | 0.210 |
| Difference (g.) | −.007 | −.002 | +.008 | +0.006 |

The tabulated results show that by passing gaseous mixtures containing hydrogen sulfide and sulfur dioxide through an absorbent prepared according to my invention I have succeeded in selectively absorbing the hydrogen sulfide substantially quantitatively while the sulfur dioxide passed through substantially unaffected. Moreover, I have found that an absorbent made according to my procedure is uniform from batch to batch, has satisfactory mechanical properties, and is consistently selective in its operation. These characteristics, all of them essential to a satisfactory absorbent for the service described, are not possessed by any of the hydrogen sulfide absorbents hitherto known.

In using the words "soluble" and "solution" in the description of my invention I refer to aqueous solutions. Although, as stated above, I prefer to use cupric sulfate as the soluble cupric salt employed in the reaction, I may use other soluble cupric salts. Thus, by way of example, I may use cupric nitrate or chloride in place of the sulfate, or in admixture therewith, as my absorbent may be made by mixing any solutions containing cupric or orthophosphate ions while maintaining the above described hydrogen ion concentration.

I claim:

1. The method of removing hydrogen sulfide substantially quantitatively from a gaseous stream also containing sulfur dioxide without substantially changing the amount of sulfur dioxide in said gaseous stream comprising passing said stream in contact with the precipitate formed when a solution of cupric salt and a solution of orthophosphate are reacted together while maintaining a hydrogen ion concentration between pH values of 1.0 and 5.0 and which has been dried at a temperature under 1200° F.

2. The method of removing hydrogen sulfide substantially quantitatively from a gaseous stream also containing sulfur dioxide without substantially changing the amount of sulfur dioxide in said gaseous stream comprising passing said stream in contact with the precipitate formed when a solution of cupric salt and a solution of orthophosphate are reacted together while maintaining a hydrogen ion concentration between pH values of 3.0 and 3.2 and which has been dried at a temperature under 1200° F.

DAVID K. EADS.

REFERENCES CITED

The following references are of record in the file of this patent:

UNITED STATES PATENTS

| Number | Name | Date |
|---|---|---|
| 2,375,041 | Schmerling et al. | May 1, 1945 |

OTHER REFERENCES

Mellor, "Comprehensive Treatise on Inorganic and Theoretical Chemistry," vol. 3, pages 287–289, 1923, Longmans, Green & Co., N. Y., N. Y.